United States Patent [19]

Tanimura et al.

[11] Patent Number: 5,277,085
[45] Date of Patent: Jan. 11, 1994

[54] MULTI-SHAFT ELECTRICALLY-OPERATED AUTOMATIC NUT RUNNER

[75] Inventors: Syuzo Tanimura; Tokio Kanatomi, both of Tokyo; Fumio Kamanoi, Ichikawa; Mitsuo Sato, Kodaira, all of Japan

[73] Assignee: Bridgestone Corporation, Tokyo, Japan

[21] Appl. No.: 951,771

[22] Filed: Sep. 28, 1992

[30] Foreign Application Priority Data

Nov. 26, 1991 [JP] Japan .................. 3-310847

[51] Int. Cl.$^5$ ............................................ B25B 17/00
[52] U.S. Cl. .................. 81/57.22; 81/57.14; 81/57.24; 81/57.36
[58] Field of Search ............ 81/57.14, 57.22, 57.24, 81/57.3, 57.31, 57.32, 57.36

[56] References Cited

U.S. PATENT DOCUMENTS 2,574,156 11/1951 Pechacek .
3,134,275 5/1964 Davison .
3,180,612 4/1965 Spyridakis et al. .
4,183,265 1/1980 Pauley .
4,909,105 3/1990 Namiki et al. .

FOREIGN PATENT DOCUMENTS 55-76241 6/1980 Japan .
61-17787 5/1986 Japan .

*Primary Examiner*—D. S. Meislin
*Attorney, Agent, or Firm*—Oliff & Berridge

[57] ABSTRACT

Stopper pins are arranged on a path of movement of respective reaction-force receiving cam plates and are urged by urging forces of compression coil springs in a direction in which the stopper pins project from circular holes. As a solenoid is energized, the stopper pins are accommodated into the circular holes. The solenoid is operated by means of a stopper switch, and the solenoid in an energized state allows each combination socket to be fitted over a corresponding wheel-mounting nut. With the combination sockets fitted over all of the wheel-mounting nuts, the operation of the stopper switch causes the stopper pins to move to a projected position to prevent rotation of the reaction-force receiving cam plates, so that high torque is imparted to transmission shafts, allowing four wheel-mounting nuts to be simultaneously tightened or loosened.

22 Claims, 8 Drawing Sheets

5,277,085

MULTI-SHAFT ELECTRICALLY-OPERATED AUTOMATIC NUT RUNNER

BACKGROUND OF THE INVENTION

1. Field of the Invention

The present invention relates to a multi-shaft electrically-operated automatic nut runner in which a plurality of driving shafts rotate by being electrically operated, and a plurality of transmission shafts are coupled with the driving shafts via torque-changing means, wherein an arrangement is provided such that a pitch circle diameter of sockets fixed to the transmission shafts is equal to a pitch circle diameter of wheel-mounting nuts of a vehicle, and the sockets are rotated to loosen or tighten the wheel-mounting nuts simultaneously.

2. Description of the Related Art

When the operation of removing and fitting a tire is performed for repairing a punctured tire of a vehicle, particularly a truck or a bus, for changing the tire with a new one, or for effecting the rotation of tires, the operator performs the operation by holding a pneumatic impact wrench with the vehicle jacked up. Since the impact wrench is heavy, the impact wrench is sometimes carried by being suspended from a crawler-type impact-wrench suspending machine.

Since an ordinary impact wrench has a single shaft, the operator consecutively loosens a plurality of (usually 8 to 10) wheel nuts by using the impact wrench to allow the tire to be removed.

However, the pneumatic impact wrench produces loud sounds and constitutes a source of noise. In addition, since the vibration is intense, the pneumatic impact wrench imposes a large burden (such as numbness of the hand) on the operator who holds it. Furthermore, there are cases where the pneumatic impact wrench undergoes fluctuations in the air pressure, which can cause variations in the value of tightening torque and, hence, variations in the tightening torque of each wheel nut.

To overcome the noises, vibrations, and torque fluctuations which are the drawbacks of the pneumatic impact wrench, it suffices to employ an electrically-operated automatic nut runner. With the electrically-operated automatic nut runner, however, since the number of revolutions of a driving source is reduced to obtain high torque, the operation time increases substantially, and the operating efficiency deteriorates.

To solve these problems, a multi-shaft automatic nut runner has been proposed which is provided with a multiplicity of shafts and is capable of simultaneously tightening a plurality of wheel nuts (refer to Japanese Utility-Model Application Publication No. 17787/1986, for example). The automatic nut runner disclosed in this publication has a variable pitch circle diameter and can therefore be made to correspond to pitch circle diameters of different vehicle types.

Consequently, the aforementioned automatic nut runner is capable of controlling the noises, vibrations, and torque fluctuations while maintaining an operating time equivalent to that of the pneumatic impact wrench.

The aforementioned automatic nut runner is used in the process of assembling vehicles. Namely, since the wheel nut enters the socket in a state in which the wheel nut is loosened with respect to an inner nut, the wheel nut can be rotated (tightened) with a relatively low torque at the beginning of fitting in. Even if the sockets are fitted over the respective wheel nuts with time lags, the operation is not affected much.

However, in the process of loosening the wheel nuts, i.e., in a process such as the operation of changing the tire, since a maximum torque is required from the outset when the sockets are fitted over the respective wheel nuts, if even one socket is fitted over the wheel nut, a force for rotating the entire automatic runner is generated centering around that fitted shaft, so that the other sockets fail to be fitted over the other wheel nuts.

SUMMARY OF THE INVENTION

In view of the above-described circumstances, it is an object of the present invention to provide a multi-shaft electrically-operated automatic nut runner which is capable of controlling noises, vibrations, and torque fluctuations and of reducing the operating time by using a multiplicity of shafts in the automatic nut runner, and which facilitates the fitting of sockets when wheel-mounting nuts are tightened or loosened.

To this end, in accordance with the present invention, there is provided a multi-shaft electrically-operated automatic nut runner capable of simultaneously rotating a plurality of wheel-mounting nuts, including: a plurality of driving devices each having a driving shaft, and to which a rotational driving force is imparted by means of an electric power source; a plurality of transmitting members disposed in correspondence with the plurality of driving devices, each of the plurality of transmitting members being adapted to transmit the rotational driving force, imparted to a corresponding one of the plurality of driving devices, to a corresponding one of the wheel-mounting nuts; a plurality of sockets disposed in correspondence with the plurality of transmitting members and arranged such that a pitch circle diameter of the plurality of sockets is equal to a pitch circle diameter of the wheel-mounting nuts; a plurality of torque-changing devices each disposed between a corresponding one of the plurality of driving devices and a corresponding one of the plurality of transmitting members, each of the plurality of torque-changing devices being adapted to change a torque of the rotational driving force of the corresponding one of the plurality of driving devices so as to transmit the torque to the corresponding one of the plurality of transmitting members; a plurality of torque-generating rotating members disposed in correspondence with the plurality of torque-changing devices, each of the plurality of torque-generating rotating members being coupled with a corresponding one of the plurality of driving devices via a corresponding one of the plurality of torque changing devices and being adapted to cause a corresponding one of the plurality of transmitting members to generate torque of a first predetermined value or less during free rotation and to cause the corresponding one of the plurality of transmitting members to generate torque greater than or equal to a second predetermined value higher than the first predetermined value during stoppage of rotation so as to rotate the corresponding transmitting member; and a plurality of stopper devices disposed in correspondence with the plurality of torque-generating rotating members, each of the plurality of stopper devices being disposed within an area of movement of a corresponding one of the plurality of torque-generating rotating members and adapted to simultaneously set the plurality of torque-generating rotating members in a rotatable condition or in a nonrotatable condition.

In accordance with the above-described arrangement, when the wheel-mounting nuts are loosened for changing tires and for other purposes, the stopper devices are moved in advance to the retracted position at which the torque-generating rotating members are freely rotatable. In this state, the driving of the automatic nut runner is started, and the sockets of the shafts are fitted over the respective wheel-mounting nuts. At this time, the sockets of the respective shafts are not simultaneously fitted over the wheel-mounting nuts, and are fitted with certain time lags. However, since the torque-generating rotating members are made freely rotatable, the torque of the transmitting members, to which the sockets fitted over the wheel-mounting nuts are fixed, is low, and the rotation is stopped in the fitted state. Hence, no reaction force is applied to the operator. When all of the sockets fixed to the transmitting members are fitted over the respective wheel-mounting nuts, the stopper devices are moved to the projecting position. As a result, the rotation of the torque-generating rotating members is prevented, and all the driving torque of the automatic nut runner is transmitted to the transmitting members, thereby making it possible to loosen the wheel-mounting nuts. Namely, since high torque can be simultaneously imparted to the plurality of transmitting members by virtue of the projection of the stopper devices, a reaction force, which could otherwise occur when high torque is imparted to only some transmitting members, can be prevented from being applied to the operator. Thus, the multi-shaft electrically operated automatic nut runner in accordance with the above-described arrangement excels in safety and makes it possible to improve the operating efficiency.

As described above, the multi-shaft electrically-operated automatic nut runner in accordance with the present invention offers an outstanding advantage in that it makes it possible to control noises, vibrations, and torque fluctuations, to reduce the operating time by means of the multiplicity of shafts, and to facilitate the fitting of sockets when wheel-mounting nuts are tightened or loosened.

The other objects, features and advantages of the present invention will become more apparent from the following detailed description of the invention when read in conjunction with the accompanying drawings.

DESCRIPTION OF THE PREFERRED EMBODIMENT

Figure 1:
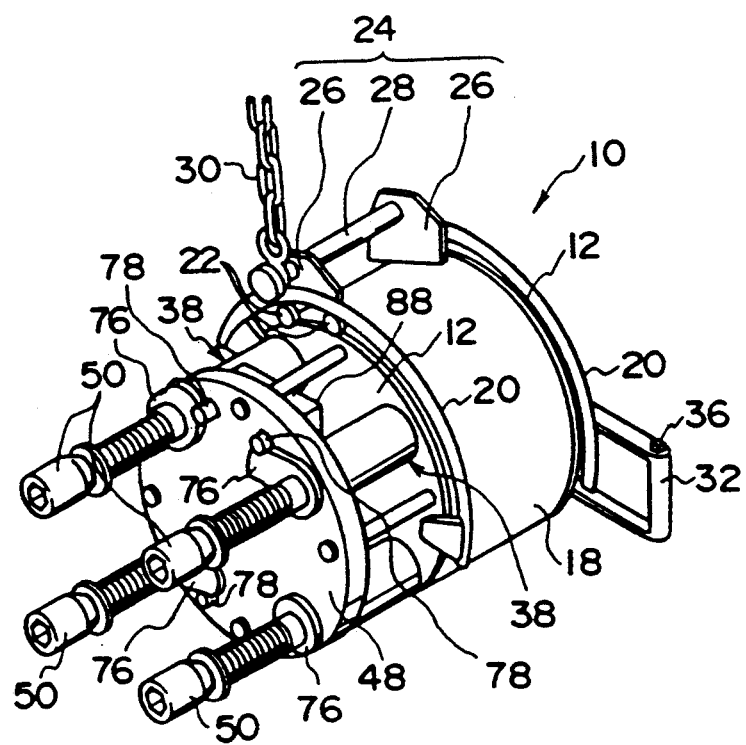
FIG. 1 is a perspective view of an automatic nut runner in accordance with an embodiment of the present invention.
Figure 2:
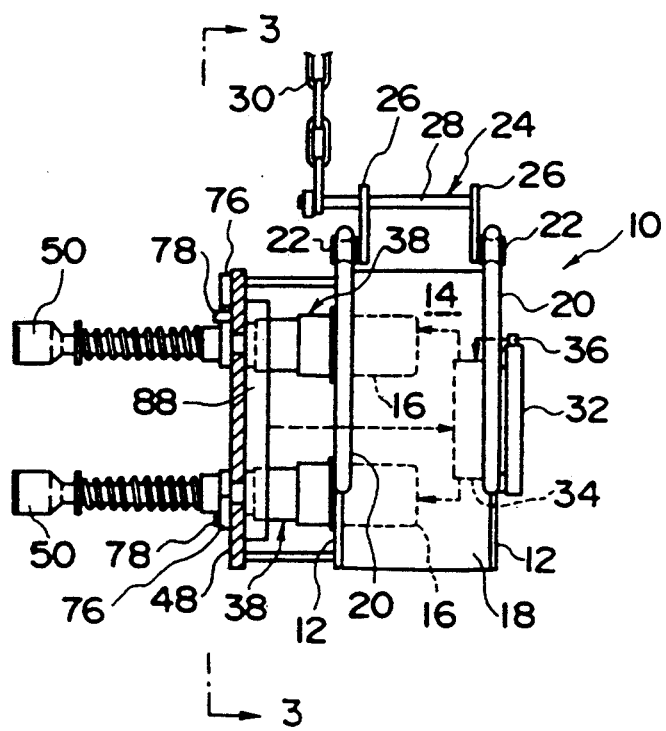
FIG. 2 is a side elevational view of the automatic nut runner in accordance with the embodiment.
Figure 3:
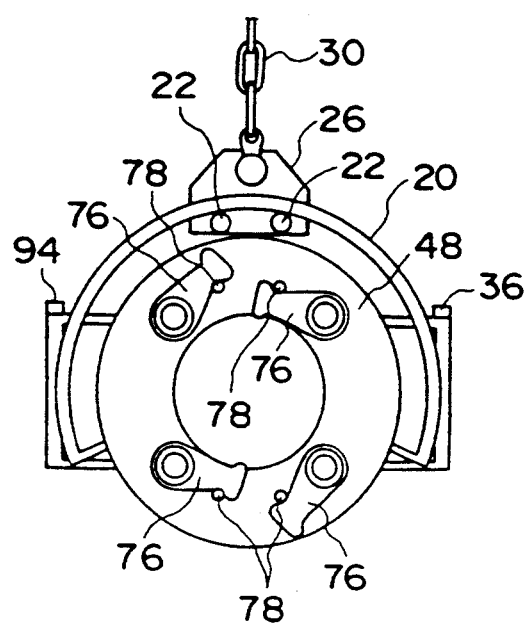
FIG. 3 is a cross-sectional view taken along line 3—3 of FIG. 2.

FIGS. 1 to 3 illustrate a 4-shaft electrically-operated nut runner 10 (hereafter simply referred to as the nut runner 10) in accordance with an embodiment of the present invention.

The nut runner 10 has a pair of disks 12 secured in parallel with each other and having a predetermined interval therebetween. As a result, a space portion 14 is formed between these disks 12, and driving units 16, constituting part of a driving means, for rotating respective shafts are disposed on an inner side of one disk 12. The driving units 16 are capable of rotating the respective shafts in both a forward direction and a reverse direction. The space portion 14 is covered with an outer plate 18 at a peripheral portion thereof. Each of the disks 12 is provided with a rail member 20 over approximately a half of the circumference thereof. The nut runner 10 is supported in a state in which it is suspended by a support 24 connected thereto via the rail members 20 and rollers 22.

The support 24 comprises a pair of trapezoidal support plates 26 and a shaft 28 connecting them. A chain 30 is attached to one side of the shaft 28. As this chain 30 is connected to an unillustrated crane or the like, the nut runner 10 can be held by the crane or the like.

The support 24 is movable along the rail members 20, so that the entire nut runner 10 can be rotated approximately 40°.

A pair of grips 32 are attached to the other disk 12 in such a manner as to extend horizontally therefrom. The operator operates the nut runner 10 while holding the grips 32. Specifically, a drive switch 36 electrically connected to a controller 34 is attached to one of the grips 32, and the driving units 16 can be driven by operating this drive switch 36. The driving units 16 are electrically connected to the controller 34 and are driven by a signal from the controller 34. Rotating portions 38 of the four shafts project respectively from the driving units 16 through one disk 12.

Figure 4:
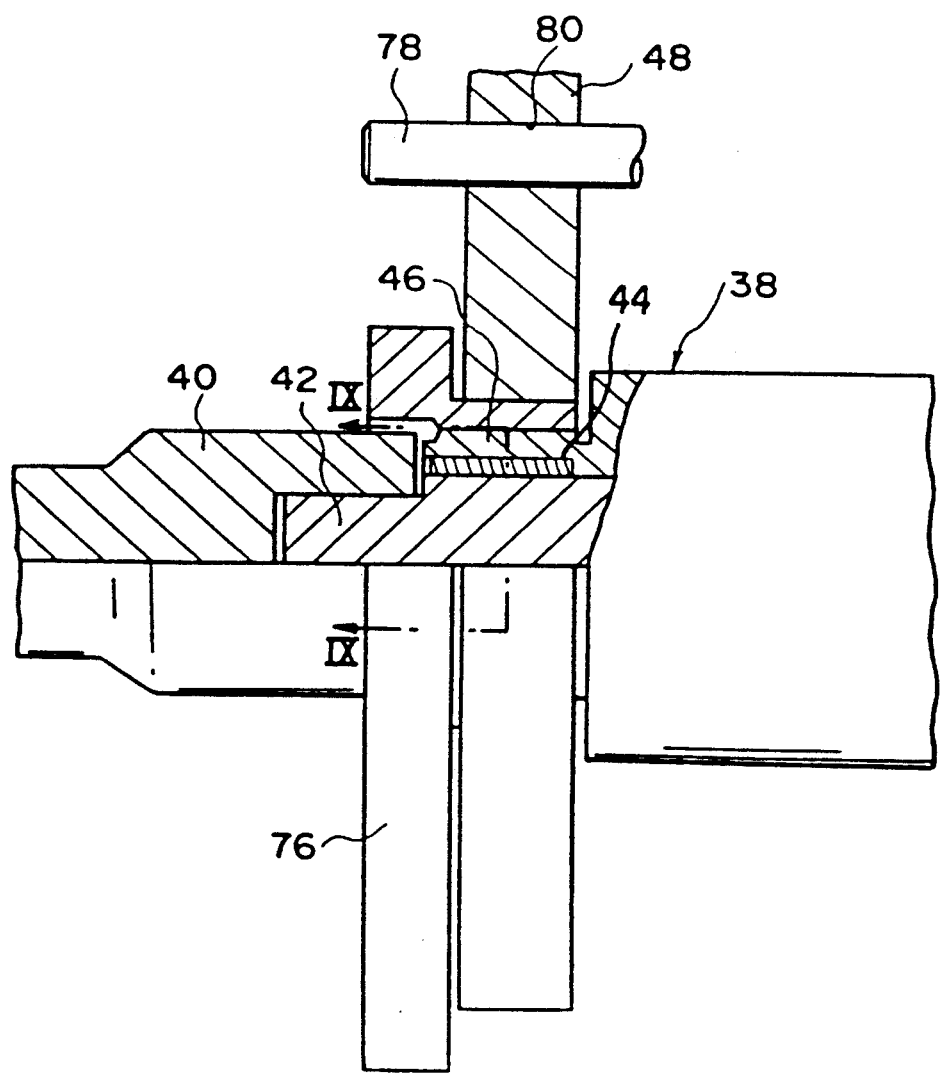
FIG. 4 is a partially cross-sectional view of a state of coupling between a rotating shaft and an extension bar.

As shown in FIG. 4, each of these rotating portions 38 has a three-layered structure having layers arranged concentrically one over another. Specifically, a transmission shaft 42 for transmitting a driving force to an extension bar 40, which will be described later, is formed as an innermost portion. A reaction-force receiving cam plate 76 serving as a rotating member for generating torque is formed as an outermost layer. An internal gear 46, which is rotatively driven by a driving force of the driving unit 16, is formed as an intermediate layer. The reaction-force receiving cam plate 76 is spline-fitted with the internal gear 46, while the transmission shaft 42 passing through a fixing outer frame 48 is spline-fitted with the extension bar 40.

Figure 5A:
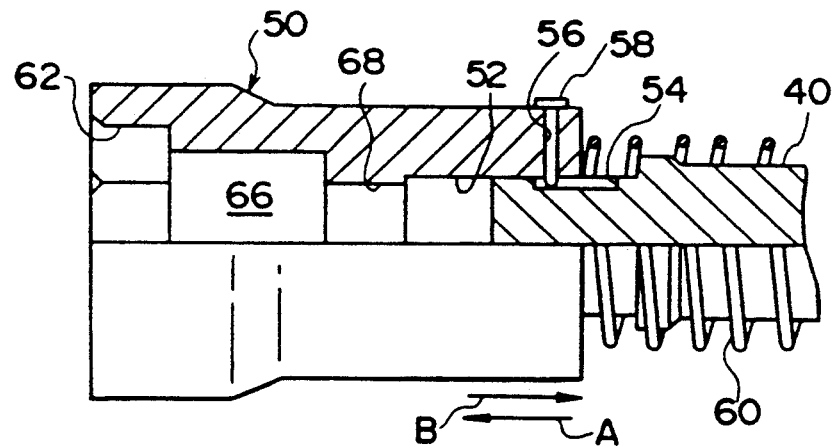
FIG. 5A is a partially cross-sectional view illustrating a state of coupling between a combination socket and the extension bar.
Figure 5B:
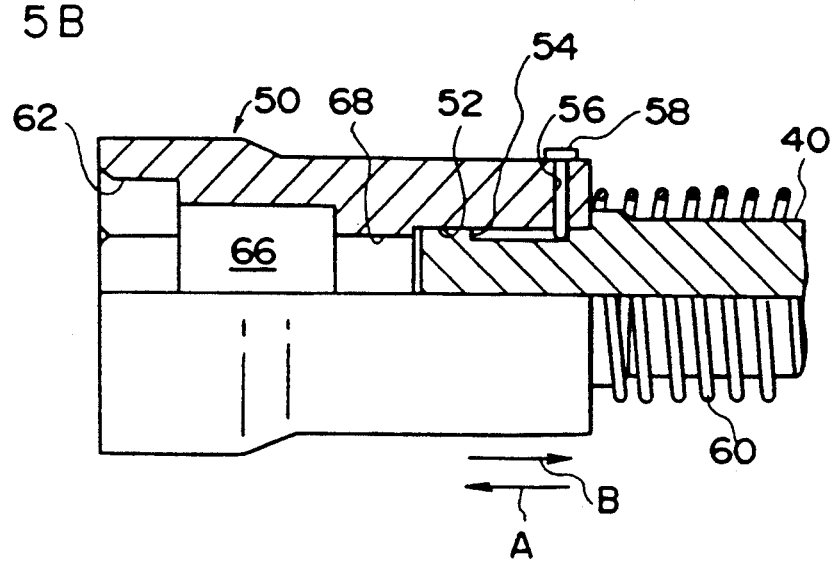
FIG. 5B is a partially cross-sectional view illustrating a state of coupling between the combination socket and the extension bar.

As shown in FIGS. 5A and 5B, a distal end of the extension bar 40 is inserted in a hole 52 provided in an end face of a combination socket 50. For this reason, the extension bar 40 and the combination socket 50 are movable in the axial direction relative to each other.

An elongated groove 54 is formed in an outer periphery of the extension bar 40 in the vicinity of the distal end thereof. A through hole 56 extending to the aforementioned hole 52 is provided in an outer peripheral portion of the combination socket 50. An internal thread is formed on an inner peripheral surface of the through hole 56.

The elongated groove 54 corresponds to the through hole 56 in a state in which the extension bar 40 is inserted in the hole 52 in the combination socket 50. Here, as a screw 58 is threadedly engaged with the internal thread of the through hole 56, a tip of the screw 58 enters the elongated groove 54, thereby preventing the combination socket 50 from coming off of the extension bar 40 and limiting the amount of axial movement of the combination socket 50.

A compression coil spring 60 is fitted on the outer periphery of the extension bar 40. One end of the compression coil spring 60 abuts against the aforementioned end face of the combination socket 50, while the other end thereof abuts against a raised portion of a large-diameter portion of a proximal portion of the extension bar 40. For this reason, the combination socket 50 is urged so as to move in a direction away from the extension bar 40 (in the direction of arrow A in FIG. 5A). Accordingly, when a force for pressing the combination socket 50 toward the extension bar 40 is applied to the combination socket 50, the combination socket 50 moves (in the direction of arrow B in FIG. 5B) against the urging force of the compression coil spring 60 until the tip of the screw 58 abuts against one end of the elongated groove 54. When this pressing force disappears, the combination socket 50 returns to its original position by the urging force of the compression coil spring 60 (see FIG. 5A).

The combination socket 50 is provided with a first socket portion 62 formed by being cut out in hexagonal form in the end face of the combination socket 50 opposite from extension bar 40. This first socket portion 62 can be fit over a wheel-mounting nut 64 (see FIG. 8A). The bottom surface of this first socket portion 62 is bored to form a circular hollow portion 66, the bottom of which is further cut out in square form, thereby forming a second socket portion 68. This second socket portion 68 is used for tightening or loosening an inner nut 70 (see FIG. 8A). The inner nut 70 and the second socket portion 68 are fitted with each other in a state in which the wheel-mounting nut 64 has been removed and an outwardly located tire as viewed in the transverse direction of the vehicle has been removed.

Figure 7:
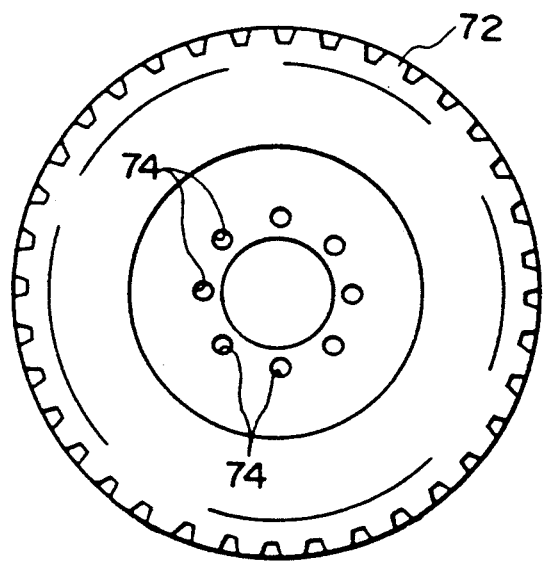
FIG. 7 is a front elevational view of a tire in accordance with the embodiment.

A pitch circle diameter of the combination sockets 50 is equal to a pitch circle diameter of wheel-mounting holes 74 provided in a tire 72, shown in FIG. 7, of a large vehicle such as a truck or a bus. Here, the number of the wheel-mounting nuts 64 of the vehicle is set to be eight. The pitch between adjacent ones of the combination sockets 50 is set to be twice as large as the pitch between adjacent ones of the wheel-mounting nuts 64 of the vehicle. As a result, the first socket portion 62 and the second socket portion 68 of the combination socket 50 are capable of fitting over every other wheel-mounting nut 64 and inner nut 70.

Figure 9:
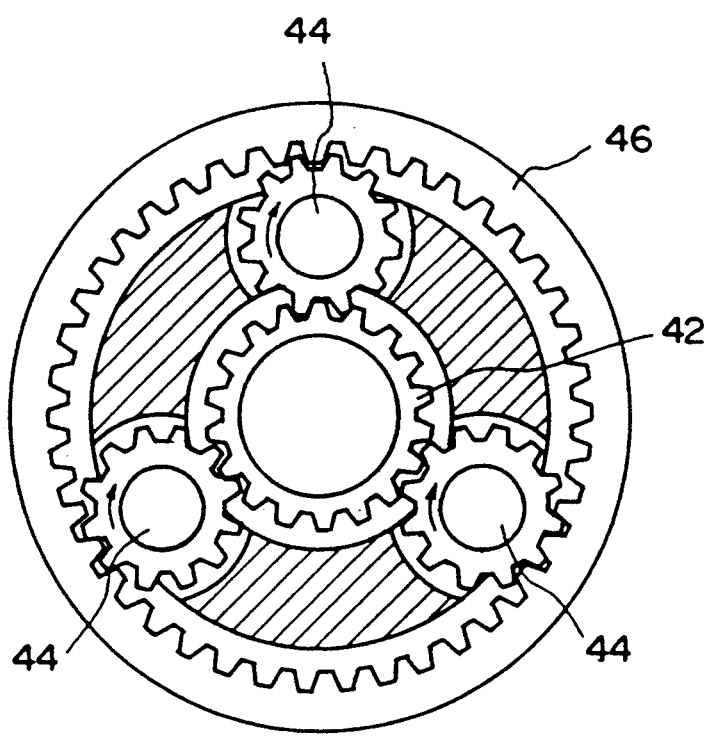
FIG. 9 is a cross-section of a front elevational view of a general gear transmission mechanism taken along line IX—IX in FIG. 4.

As shown in FIG. 4, the transmission shaft 42 has teeth (not shown) formed around its outer periphery and serves as a sun gear. As shown in FIG. 9, a plurality of planetary gears 44 (which generally has a structure such as the one shown in FIG. 9, and which is not shown in FIG. 4) mesh with the teeth of the transmission shaft 42. Furthermore, the internal gear 46 meshes with the planetary gears 44. The internal gear 46 is coupled with the reaction force receiving cam plate 76 disposed on the outer side (on the combination socket 50 side) of the fixing outer frame 48 as viewed in the thicknesswise direction thereof. As a result, the reaction-force receiving cam plate 76 is adapted to rotate integrally with the internal gear 46.

The planetary gears 44 (shown in FIG. 9 but not shown in FIG. 4) are adapted to revolve around the transmission shaft 42, i.e., the sun gear, by a driving force transmitted from the driving unit 16. Both the internal gear 46 and the reaction-force receiving cam plate 76 are rotated as the planetary gears 44 revolve. When the combination socket 50 is fitted over the wheel-mounting nut 64 in a tightened state, the internal gear 46 and the reaction force receiving cam plate 76 are rotated freely by the revolution of the planetary gears 44.

Consequently, the torque for tightening or loosening the wheel-mounting nut 64 is not transmitted to the extension bar 40.

In addition, even if a portion of the combination socket 50 fixed to each of the four transmission shafts 42 via the extension bar 40 is fitted over the wheel-mounting nut 64, only the internal gear 46 and the reaction-force receiving cam plate 76 rotate. As a result, the driving force (torque) is not transmitted to the transmission shaft 42 and the extension bar 40.

Figure 6:
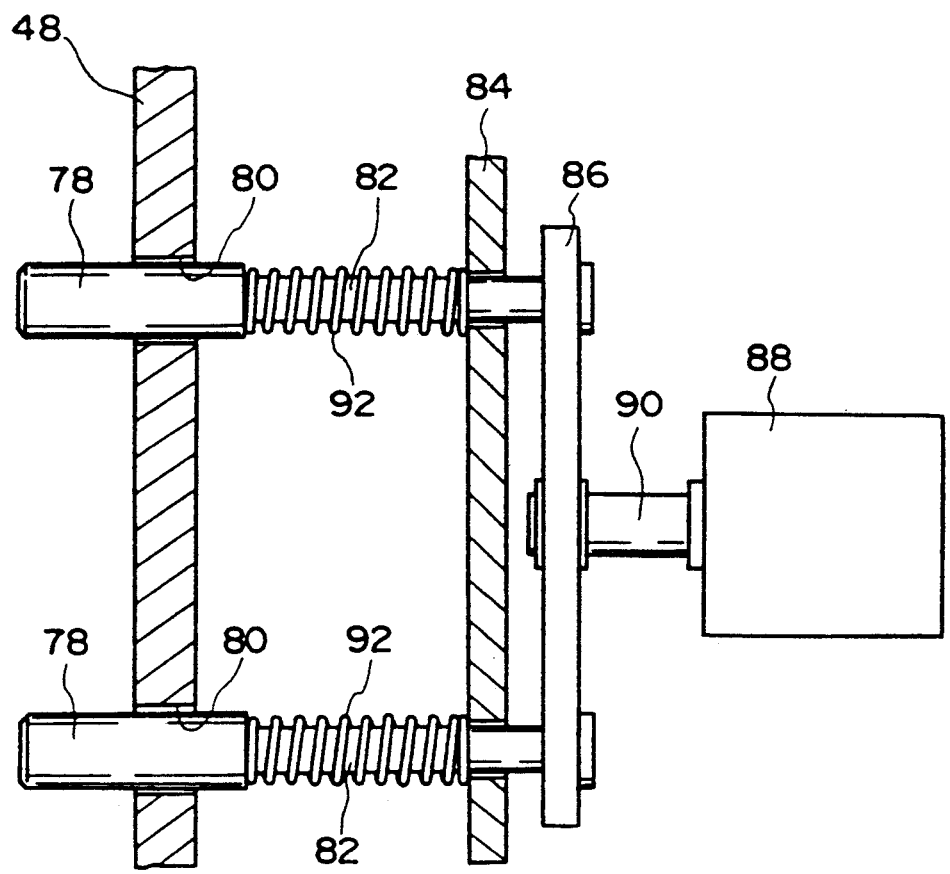
FIG. 6 is a cross-sectional view of a mechanism for driving stopper pins.

As shown in FIGS. 4 and 6, stopper pins 78 capable of projecting outwardly from or retracting into the fixing outer frame 48 are each arranged on the path of movement of the respective reaction-force receiving cam plate 76. Each of these stopper pins 78 passes through a circular hole 80 (see FIG. 6) provided in the fixing outer frame 48. A small-diameter shaft 82 is coaxially fixed to a proximal-end face of the stopper pin 78 and is inserted through a support plate 84 arranged in parallel with the fixing outer frame 48. The four small-diameter shafts 82 are secured to a single moving plate 86, and this moving plate 86 is fixed to a driving shaft 90 of a solenoid 88, constituting driver means.

A compression coil spring 92 is provided around an outer periphery of each of the small-diameter shafts 82, and one end thereof abuts against a proximal end face of the stopper pin 78, while the other end thereof abuts against the support plate 84. As a result, each of the stopper pins 78 is urged by the urging force of the compression coil spring 92 in a direction in which the stopper pin 78 projects from the circular hole 80 in the fixing outer frame 48 (i.e., at a projected position). In this state, if the solenoid 88 is energized, the distal end of the stopper pin 78 is accommodated into the circular hole 80 in the fixing outer frame 48 against the urging force of the compression coil spring 92 (i.e., at a retracted position).

The solenoid 88 is electrically connected to the controller 34. The energization and deenergization of the solenoid 88 is effected by a stopper switch 94 (see FIG. 3) which is provided on the grip 32 and is electrically connected to the controller 34. A contact of the stopper switch 94 is adapted to be opened and closed each time the stopper switch 94 is pressed. When the operation of loosening the wheel-mounting nuts 64 is performed, the combination sockets 50 are fitted over the wheel-mounting nuts 64 with the solenoid 88 energized. After the combination sockets 50 are respectively rotated axially in the same direction and are fitted over the respective wheel-mounting nuts 64, the operation of the stopper switch 94 causes the stopper pins 78 to move to the projected position to stop the rotation of the reaction force receiving cam plates 76. Hence, the rotation of the internal gear 46 is stopped, and a large driving force (torque) of the driving units 16 is imparted to the respective transmission shafts 42 via the planetary gears 44, thereby making it possible to simultaneously loosen the four wheel-mounting nuts 64. The arrangement of the transmission shafts 42, the planetary gears 44, and the internal gear 46 cooperating with the reaction-force receiving cam plates 76 and the stopper pins 78 constitutes a torque changing means.

The operation of this embodiment will be described hereinafter.

The operator holds the nut runner 10 and operates the drive switch 36 to rotate the four combination sockets 50. At this time, the stopper switch 94 is operated in advance to energize the solenoid 88 so as to keep the stopper pins 78 at their retracted position. As a result, the internal gear 46, which is integral with the reaction-force receiving cam plate 76 is set to be freely rotatable.

Figure 8A:
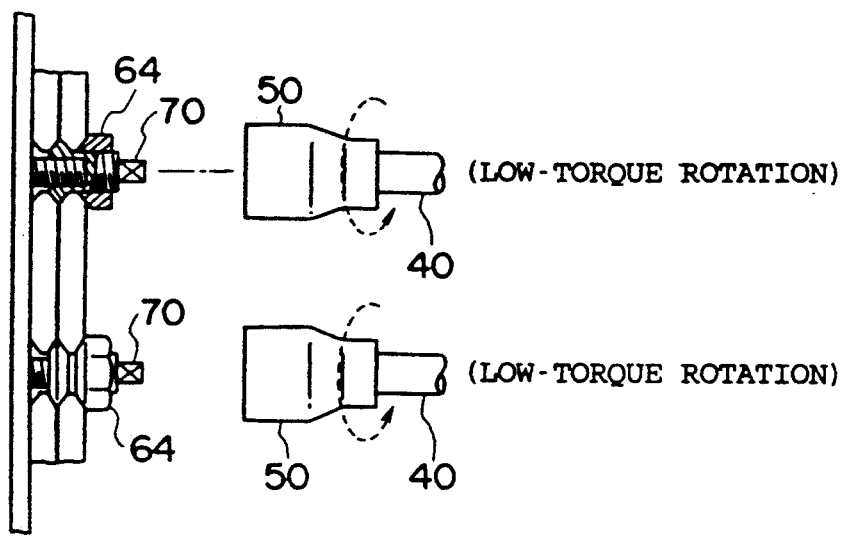
FIGS. 8A to 8C are schematic views illustrating a procedure of fitting combination sockets over wheel-mounting nuts.

Then, the nut runner 10 is moved and positioned in the vicinity of the wheel-mounting nuts 64 (see FIG. 8A). At this time, since the nut runner 10 is suspended by the chain 30 via the support 24, the nut runner 10 has excellent mobility, and the positioning thereof is facilitated. When the combination sockets 50 are positioned so as to be able to be brought into contact with and pressed against the wheel-mounting nuts 64, the combination sockets 50 are pushed in over the extension bars 40 against the urging forces of the compression coil springs 60 and are positioned. In this state, only the combination sockets 50 are made to project by the urging forces of the compression coil springs 60 and are fitted over the wheel-mounting nuts 64, so that the nut runner 10 itself does not move.

The four wheel-mounting nuts 64 and the combination sockets 50 (specifically, the first socket portions 62) are rarely fitted with each other at one time, and are usually fitted with each other consecutively with time lags.

Figure 8B:
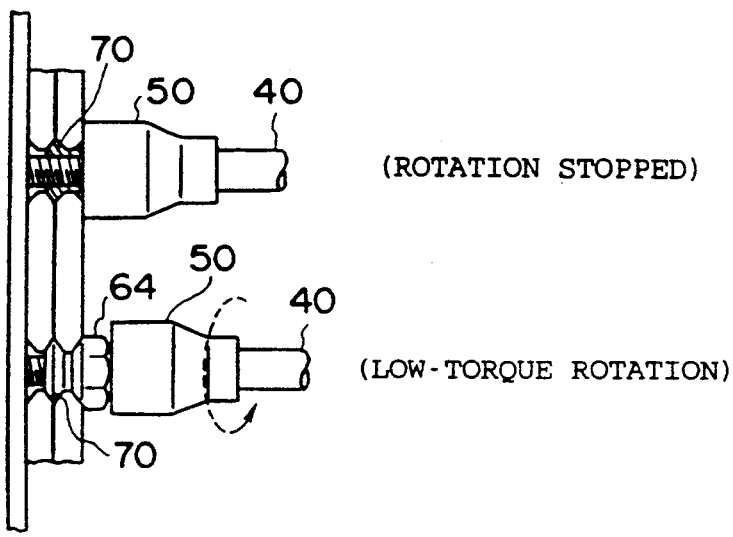

Here, if one of the combination sockets 50 (first socket portion 62) is fitted over the wheel-mounting nut 64 (see FIG. 8B), since the internal gear 46 is freely rotatable, no torque is generated for rotating this combination socket 50. Hence, the wheel-mounting nut 64 is not loosened.

After confirming that all of the four combination sockets 50 (first socket portions 62) are fitted over the respective wheel-mounting nuts 64, the operator operates the stopper switch 94 to deenergize the solenoid 88. Consequently, the stopper pins 78 are moved to their projected position by the urging force of the compression coil springs 92.

Figure 8C:
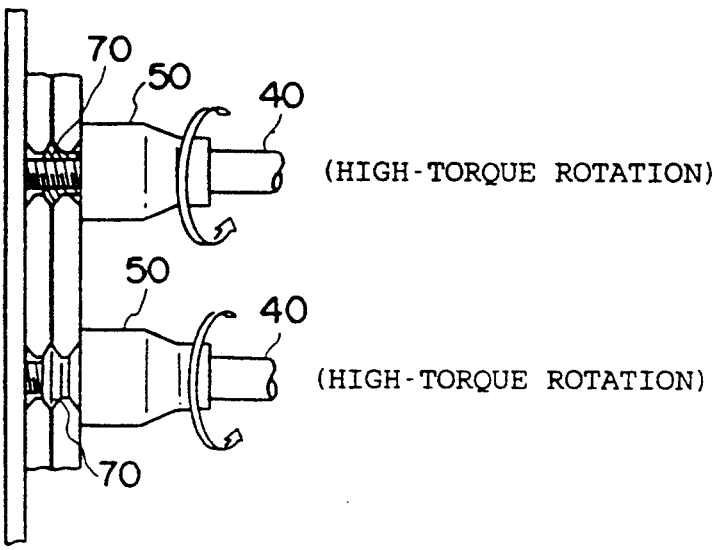

As a result, the rotation of the reaction-force receiving cam plates 76 is stopped by the stopper pins 78. When the rotation of the reaction force receiving cam plates 76 is stopped, the rotation of each internal gear 46 stops. Then, as the planetary gears 44 revolve, each transmission shaft 42 is rotated, thereby allowing high torque to be transmitted to each socket 50 via the extension bar 40 (see FIG. 8C). By virtue of this high torque, the four wheel-mounting nuts 64 can be loosened simultaneously.

For this reason, a force produced in the nut runner 10 becomes uniform in the circumferential direction thereof, and a nonuniform force, which would otherwise occur in the nut runner 10 when high torque is imparted to some sockets, is not produced. Hence, the safety of the operator is secured.

When an inner tire is removed after removal of the outer tire 72, it has been conventionally necessary to replace the sockets with those compatible with the inner nuts 70. In this embodiment, however, since the second socket portion 68 is provided in the deep interior of each of the first socket portions 62, and since the outer tire 72 has been removed, the second socket portions 68 can be fitted over the inner nuts 70, and the inner nuts 70 can be loosened with a uniform distribution of torque similar to that described above.

At the time of the operation of tightening the wheel-mounting nuts 64 as well, the stopper pins 78 are set in advance in their retracted position. Then, after confirming that all of the four combination sockets 50 (first socket portions 62) are fitted over the respective wheel-mounting nuts 64, the operator operates the stopper switch 94 to deenergize the solenoid 88. As a result, the stopper pins 78 are moved to their projected position by the urging forces of the compression coil springs 92.

Then, the rotation of the reaction-force receiving cam plates 76 is stopped by the stopper pins 78. When the rotation of the reaction force receiving cam plates 76 is stopped, the rotation of the internal gear 46 is stopped. Then, as the planetary gears 44 revolve, the transmission shafts 42 are rotated, thereby allowing high torque to be transmitted to the sockets 50 via the extension bars 40 (see FIG. 8C).

Thus, in this embodiment, even if the multiplicity of shafts (four shafts) are adopted in the nut runner 10, there is no nonuniformity of torque which would otherwise occur during the operation of tightening or loosening the wheel-mounting nuts 64 or the inner nuts 70, and it is possible to effect the tightening or loosening operation in a stable condition. Therefore, the nut runner 10 can be optimally used in an operation in which the wheel-mounting nuts 64 or the inner nuts 70 need to be loosened, such as in repair of a punctured tire 72, tire rotation, and replacement of the tire with a new one.

Since the nut runner 10 is an electrically-operated type, it is possible to prevent noises, vibrations, and torque fluctuations encountered with a pneumatic impact wrench. At the same time, since a multiplicity of shafts are adopted, it is possible to prevent a decline in the operating efficiency resulting from a decrease in the rotational speed of the nut runner.

In addition, since the nut runner 10 is the electrically-operated type, the adjustment of torque is facilitated, post-adjustment variations of torque are practically nil, and it is possible to output the torque on a stable basis.

Although, in this embodiment, four shafts are adopted for the rotating portions 38 of the nut runner 10, in a case where 10 wheel-mounting nuts are used depending on the type of vehicle, higher efficiency is obtained by providing five shafts for the rotating portions 38. Furthermore, if two shafts are provided for the rotating portions 38, and if the pitch between the shafts is made changeable, the nut runner can be used for vehicles whose pitch circle diameters of the wheel-mounting nuts differ, thereby improving the versatility.

In addition, although in this embodiment the internal gears 46, i.e., driving gears, are driven by independent driving sources, the internal gears 46 may be driven by a single driving source.

What is claimed is:

1. A multi-shaft electrically-operated automatic nut runner capable of simultaneously rotating a plurality of wheel-mounting nuts, comprising:
   a plurality of sockets shaped to correspond to a shape of said wheel-mounting nuts, said sockets having a pitch circle diameter equal to a pitch circle diameter of said wheel-mounting nuts;
   a plurality of transmitting members, said sockets being fixed to said transmitting members;
   a plurality of driving means for driving said sockets, wherein a rotational driving force is imparted to said driving means by means of an electrical power source, said transmitting members being coupled for rotation to said driving means;
   a plurality of torque-generating rotating members rotatably coupled to said transmitting members, said torque-generating rotating members being coupled for rotation to said driving means;
   a plurality of torque-changing means each disposed between a corresponding one of said plurality of torque-generating rotating members and a corresponding one of said plurality of transmitting members for changing a torque of the rotational driving force from said torque-generating rotating members to said transmitting members; and
   stopper means for interrupting rotation of said torque-generating rotating members, wherein when rotation of said torque-generating rotating members is interrupted, said torque of the rotational driving force is changed to said transmitting members by said torque changing means.

2. A multi-shaft electrically-operated automatic nut runner according to claim 1, wherein said sockets have a pitch circle diameter equal to a multiple of an integer of a pitch of said wheel-mounting nuts on the pitch circle thereof.

3. A multi-shaft electrically-operated automatic nut runner according to claim 1, wherein said driving means rotate in both a forward direction and a reverse direction.

4. A multi-shaft electrically-operated automatic nut runner according to claim 3, wherein said stopper means comprises a plurality of stopper members, each of said stopper members being disposed for engagement with a corresponding one of said plurality of torque-generating rotating members, said stopper members interrupting rotation of said torque-generating rotating members by engaging the corresponding one of said torque-generating rotating members.

5. A multi-shaft electrically-operated automatic nut runner according to claim 4, wherein each of said stopper members is movable between a projected and a retracted position, said stopper members interrupting rotation of the corresponding one of said plurality of torque-generating rotating members in the projected position at which each of said stopper members projects into a range of movement of the corresponding one of said plurality of torque-generating rotating members, said stopper members in said retracted position allowing the corresponding one of said plurality of torque-generating rotating members to resume rotation.

6. A multi-shaft electrically-operated automatic nut runner according to claim 5, wherein said stopper means further comprises a moving plate, said stopper members being coupled to said moving plate, said moving plate moving said stopper members between said projected position and said retracted position.

7. A multi-shaft electrically-operated automatic nut runner according to claim 6, wherein said stopper means further comprises a driving member coupled to said moving plate for moving said moving plate as said driving member is actuated.

8. A multi-shaft electrically-operated automatic nut runner according to claim 7, wherein said stopper means comprises a plurality of shaft members one end of each of said shaft members being secured to a corresponding one of said plurality of stopper members, another end of each of said shaft members being secured to said moving plate.

9. A multi-shaft electrically-operated automatic nut runner according to claim 8, wherein said stopper means further comprises a plurality of urging members, wherein a corresponding one of said plurality of urging members is disposed around an outer periphery of each of said shaft members, said urging members urging said stopper members toward said projected position.

10. A multi-shaft electrically-operated automatic nut runner according to claim 9, wherein said stopper means further comprises a control switch electronically coupled to said driving member, wherein when said control switch is turned on, said driving member causes said moving plate to move toward said retracted position against urging forces of said urging members.

11. A multi shaft electrically-operated automatic nut runner according to claim 2, wherein each of said sockets has a first socket portion and a second socket portion, said first socket portion comprising a cut out starting from one end of each of said sockets toward said driving shaft, said second socket portion comprising a portion of a bottom surface of said first socket portion being further cut out toward the driving shaft.

12. A multi-shaft electrically-operated automatic nut runner according to claim 11, wherein said first socket portion is shaped to be fitted over said wheel-mounting nut.

13. A multi-shaft electrically-operated automatic nut runner according to claim 11, wherein said second socket portion is shaped to be fitted over an inner nut.

14. A multi-shaft electrically-operated automatic nut runner capable of simultaneously rotating a plurality of wheel-mounting nuts, comprising:
   a plurality of sockets shaped to correspond to a shape of said wheel-mounting nuts, said sockets having a pitch circle diameter equal to a pitch circle diameter of said wheel-mounting nuts, a pitch of said sockets on the pitch circle thereof being equal to a multiple of an integer of a pitch of said wheel-mounting nuts on the pitch circle thereof;
   a plurality of transmitting members, said sockets being fixed to said transmitting members;
   a plurality of driving means for driving said sockets, wherein a rotational driving force is imparted in both a forward direction and a reverse direction by means of an electrical power source, said transmitting members being coupled for rotation to said driving means;
   a plurality of torque-generating rotating members rotatably coupled to said transmitting members, said torque-generating rotating members being coupled for rotation to said driving means;
   a plurality of torque-changing means each disposed between a corresponding one of said plurality of torque-generating rotating members and a corresponding one of said plurality of transmitting members for changing a torque of the rotational driving force from said torque-generating rotating members to said transmitting members;

a plurality of stoppers each disposed for engagement with a corresponding one of said plurality of torque-generating rotating members, said stopper members being movable between a projected and a retracted position, said stoppers simultaneously interrupting rotation of said torque-generating rotating members in the projected position at which each of said stoppers projects into a range of movement of a corresponding one of said plurality of torque-generating rotating members, said stoppers in said retracted position simultaneously allowing said torque-generating rotating members to resume rotation, wherein when rotation of said torque-generating rotating members is interrupted, said torque of the rotational driving force is changed to said transmitting members by said torque changing means, said torque having a first predetermined value or less during free rotation of said torque-generating rotating members and a second predetermined value higher than said first predetermined value when rotation of said torque-generating rotating members is interrupted by said stopper means;

driver means coupled to said stoppers for simultaneously moving said stoppers to and from said retracted position; and a control switch electrically connected to said driver means, said control switch actuating said driver means to move said stoppers to and from said retracted position.

15. A multi-shaft electrically-operated automatic nut runner according to claim 14, wherein said driver means comprises a moving plate, said stoppers being coupled to said moving plate, said moving plate moving said stoppers between said projected position and said retracted position.

16. A multi-shaft electrically-operated automatic nut runner according to claim 15, wherein said driver means comprises a solenoid coupled to said moving plate, said solenoid actuating said driver means to move said moving plate.

17. A multi-shaft electrically-operated automatic nut runner according to claim 16, wherein said driver means has a plurality of shaft members corresponding to said plurality of stoppers, one end of each of said shaft members being secured to a corresponding one of said plurality of stoppers, while another end of each of said shaft members is secured to said moving plate.

18. A multi-shaft electrically-operated automatic nut runner according to claim 17, wherein said driver means comprises a plurality of compression coil springs disposed around an outer periphery of each of said shaft members, said compression coil springs urging said stoppers toward said projected position.

19. A multi-shaft electrically-operated automatic nut runner according to claim 18, wherein when said control switch is turned on, said solenoid actuates said driver means to move said moving plate and said stoppers toward said retracted position against urging forces of said compression coil springs.

20. A multi-shaft electrically-operated automatic nut runner according to claim 14, wherein each of said sockets has a first socket portion and a second socket portion, said first socket portion being cut out from one end of each of said sockets toward said driving shaft and shaped to be fitted over said wheel-mounting nut, said second socket portion being further cut out from a portion of a bottom surface of said first socket portion toward the driving shaft and shaped to be fitted over an inner nut.

21. A multi-shaft electrically-operated automatic nut runner according to claim 14, wherein said torque-changing means is a planetary gear mechanism.

22. A multi-shaft electrically-operated automatic nut runner according to claim 1, wherein said torque has a first predetermined value or less during free rotation of said torque-generating rotating members and a second predetermined value higher than said first predetermined value when rotation of said torque-generating rotating members is interrupted by said stopper means.

* * * * *